United States Patent [19]

Voss et al.

[11] Patent Number: 4,707,309

[45] Date of Patent: Nov. 17, 1987

[54] DOTTING OF MOLDING TOOLS WITH DROPLETS

[75] Inventors: Gunther M. Voss, Diessen; Volker I. Gläsel, Biberach; Peter Gruber, Biberach; Walter Bubeck, Biberach, all of Fed. Rep. of Germany

[73] Assignee: Dr. Karl Thomae GmbH, Biberach an der Riss, Fed. Rep. of Germany

[21] Appl. No.: 593,978

[22] Filed: Mar. 27, 1984

[30] Foreign Application Priority Data

Apr. 8, 1983 [DE] Fed. Rep. of Germany ....... 3312634

[51] Int. Cl.[4] ........................ B29C 33/58; B29C 43/58

[52] U.S. Cl. ........................................ 264/12; 264/39; 264/40.1; 264/40.5; 264/109; 264/334; 264/338; 425/6; 425/107; 425/170; 425/DIG. 115

[58] Field of Search ................. 264/39, 12, 40.3, 40.2, 264/DIG. 72, 338, 109, 40.1, 40.5, 334; 425/103, 107, DIG. 115, 100, 102, 6, DIG. 50, 170

[56] References Cited

U.S. PATENT DOCUMENTS 3,255,716 6/1966 Knoechel et al. .................. 425/170
3,645,319 2/1972 Pondelicek et al. .................. 264/39
3,995,979 12/1976 Fedrigo ............................ 425/174.8
4,323,530 4/1982 Voss et al. .......................... 264/109
4,388,343 6/1983 Voss et al. .......................... 425/107

FOREIGN PATENT DOCUMENTS 1159621 1/1984 Canada .

*Primary Examiner*—Jeffery Thurlow
*Attorney, Agent, or Firm*—Hammond & Littell, Weissenberger & Dippert

[57] ABSTRACT

The invention is directed to a process for dotting molding tools with droplets of liquid or suspended lubricant in the production of shaped articles in the pharmaceutical, food, or catalyst fields. Pressurized lubricant solutions or suspensions and pressurized gas are alternately passed through capillaries, in conjunction with alternating single-substance nozzles, in such a way that drops are formed on the nozzle surface, in between the jets of gas, and are then detached form this surface and directed to specific zones of pressing tools. The apparatus comprises fast-acting valves for the brief release of pressurized gases and lubricant liquids or suspensions. The delivery lines of a gas valve and a liquid valve combine upstream of a capillary, and single-substance nozzles are mounted at the end of the capillaries.

5 Claims, 6 Drawing Figures

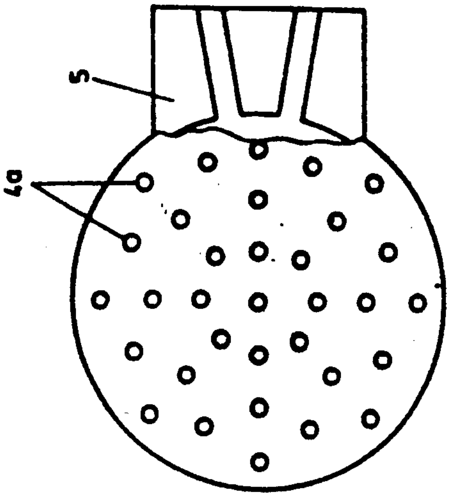
FIGURE II a
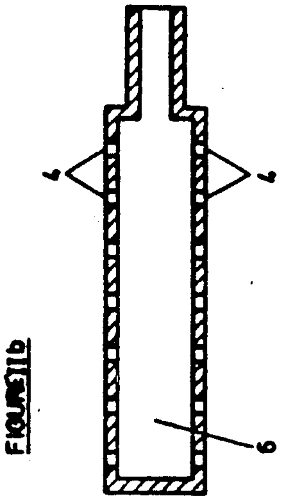
FIGURE II b
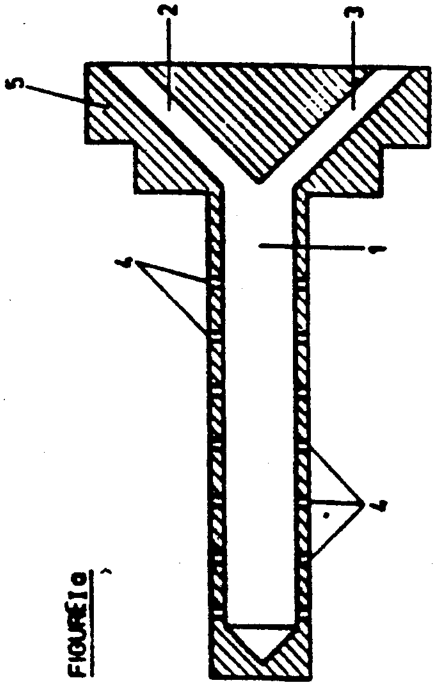
FIGURE I a
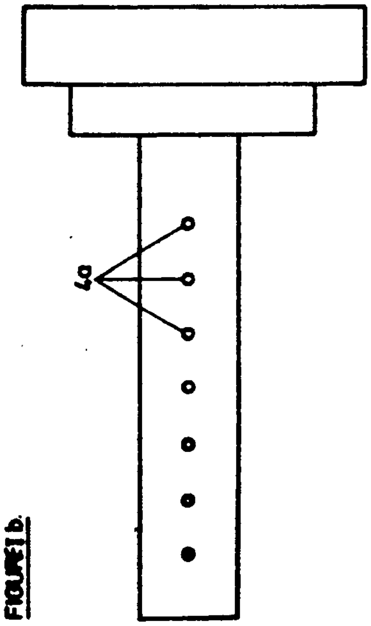
FIGURE I b

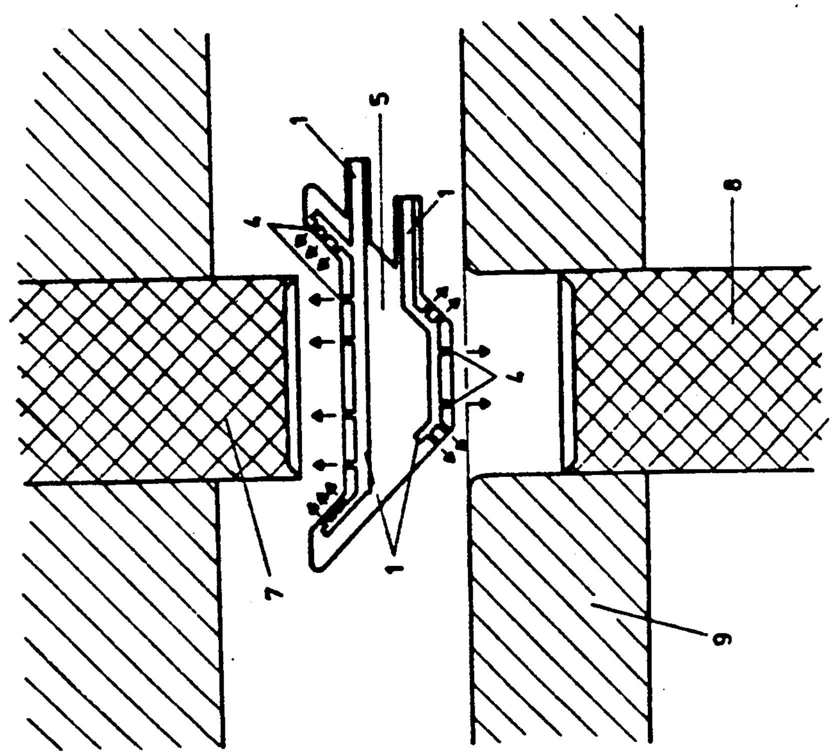
FIGURE III

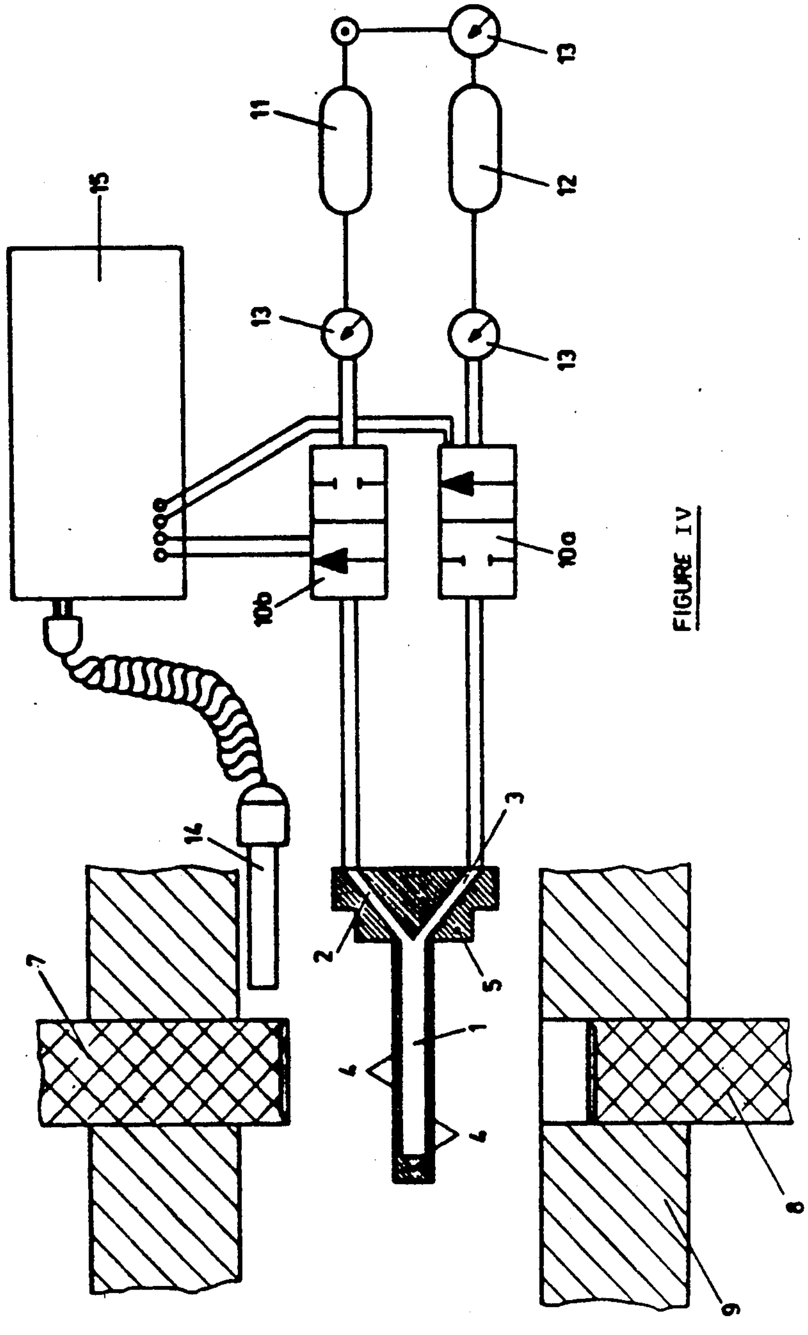
FIGURE IV

DOTTING OF MOLDING TOOLS WITH DROPLETS

FIELD OF THE INVENTION

This invention is directed to an improved process for dotting molding tools with droplets. More particularly, this invention is directed to an improved process and apparatus for dotting molding tools with droplets of liquid or suspended lubricant in the production of molded articles in the pharmaceutical, food, or catalyst field.

BACKGROUND OF THE INVENTION

U.S. Pat. No. 4,323,530, incorporated herein by reference, describes a process for compressing granulates to form tablets, coated tablet cores, and the like wherein before each compression process a certain amount of lubricant in liquid or suspended form is applied to the affected zones of the pressing tools by means of an intermittently operating nozzle system. This type of lubrication ensures that no lubricant, such as magnesium stearate, has to be added to the granulate which is to be compressed. This results, for example, in pharmaceutical compositions with a substantially better bioavailability of the active substance contained therein; moreover, significantly reduced quantities of lubricant are required. According to the process described in this patent, the lubricant is applied by means of directed spraying of specific zones of the pressing tools with the liquid or suspended lubricant by use of preferably single-substance or two-substance nozzles or dies. However, when these nozzles are used, and particularly when two-substance nozzles are used wherein air and lubricant liquid are delivered simultaneously, it has been found that droplets form with a particle spectrum which depends in its breadth upon the supply of air. These nozzles tend to produce an undesirable mist, which can lead to contamination of the tablet press, particularly the pressing plate.

The use of single-substance nozzles through which the liquid lubricant is sprayed intermittently onto the corresponding parts of the pressing tools just before each separate pressing operation has also demonstrated a tendency to contaminate the tablet-pressing plate due to the formation of a cone of spray or the occurence of stray drops of different diameters within the boundaries of the spray cone. However, when used in fast-operating tablet presses with actuating intervals of up to 5 msec the single- and two-substance nozzles also fail to give a constant dissolution of the liquid lubricant, and they generate not only individual droplets but also sequences of drops consisting of drops having different diameters. The result is that there is no guarantee of a constant action over the intended zones of the pressing tools.

It has already been proposed (cf., German Offenlegungsshrift No. 29 32 069) that these disadvantages by overcome by dotting the liquid or suspended lubricant, before each pressing operation, onto the affected zones of the pressing tools in defined quantities and in the form of discrete droplets of defined volume by means of a piezoelectric transducer in conjunction with corresponding nozzles in a directed manner. However, a certain disadvantage of this process is that the liquids to be sprayed are subject to stringent requirements with regard to their viscosity and surface tension. Only if certain limits are adhered to for the viscosity and surface tension is it possible to dot the liquids satisfactorily over the intended pressing zones. Moreover this system is sensitive to dust and is not readily suitable for the lubrication of pressing tools for compressing powdery or nongranulated materials with a high powder content, such as, for example, sorbitol compositions in the food industry.

OBJECTS OF THE INVENTION

It is an object of the invention to provide an improved process for dotting molding tools with droplets.

It is also an object of the invention to provide an improved process and apparatus for dotting molding tools with droplets of liquid or suspended lubricant in the production of molded articles in the pharmaceutical, food, or catalyst field.

These and other objects of the invention will become more apparent in the discussion below.

BRIEF DESCRIPTION OF THE INVENTION

FIG. Ia represents a cross-sectional view of a member of an apparatus according to the invention;

FIG. Ib represents a plan view of the member shown in FIG. Ia:

FIGS. IIa and IIb represent a plan view and a cross-sectional view, respectively, of a member having a configuration different from that shown in FIGS. IIa and IIb;

FIG. III represents a cross-sectional view of a further such member; and

FIG. IV represents a cross-sectional view of an apparatus according to the invention.

DETAILED DESCRIPTION OF THE INVENTION

During further investigation and development of the method described in U.S. Pat. No. 4,323,530, it has been found that all the negative side-effects can be virtually eliminated if valve systems based upon the electromagnetic or piezomechanical or piezoelectrical effect and operating in a range of from about 50 μsec. to 5 msec., preferably from about 1 to 2 msec., alternately released defined quantities of liquid, dissolved, or suspended lubricants and defined volumes of gases, e.g., air, via one or more capillary systems, which are in turn provided with nozzle openings. The jet of gas released afterwards not only causes the meniscus of the lubricant liquid or suspension to bulge up at the surfaces of the nozzle but also ensures satisfactory detachment of the droplets at the "alternating single-substance nozzles" and speeds the droplets in their flight towards the zones of the pressing tools which are to be treated.

The term "alternating single-substance nozzles" was chosen because, unlike known single-substance and two-substance nozzles, in this case the two substances, liquid and gas, leave the same nozzle opening one after another in an alternating sequence. At the same time, the jet of gas also cleans the nozzle thoroughly thus, the nozzle opening is cleaned continuously and in pulses.

To obtain a controlled droplet formation, the ratio between the pressure of the liquid and the quantity of liquid per unit of time and the pressure and quantity of gas per unit of time, as well as the nature of the capillary and nozzle system, are of great importance. Generally, at the gas pressures which are preferably used, a from about 10 to 50 times greater quantity of gas by volume, based upon the volume of the liquid, for the same unit of time is sufficient. The alternating method of operation of the valve system leads to a clean detachment of the droplets of lubricant from the nozzle opening, without any undesirable misting of the lubricant. Individual droplets of liquid are formed, detached from the nozzle, and guided and speeded towards the zones which are to be treated. The formation of any mist is avoided, and hence contamination of the tablet-making machine is averted. The acceleration of flight of droplets towards the pressing tools also makes it possible to use this apparatus in very fast-running tablet-making machines (with a circumferential speed of punch of up to about 10 m/sec.).

If a plurality of nozzles are used, these may be arranged in a row or distributed over an area of the surface and, optionally, also over the lower surface of a so-called dotting shoe. The mounting of the nozzles on a dotting shoe of this kind depends upon the shape and size of the pressed articles. The dotting shoe itself is preferably mounted immediately in front of the filling shoe between the matrix plate and the upper die so that the droplets of lubricant delivered arrive by the shortest possible path and in the right direction on the active surface of the pressing tools which they thus lubricate. The term "liquid lubricants" also covers molten lubricants.

Each capillary in the dotting shoe is attached to a valve system either per se or together with certain associated capillaries. The valve system alternately releases a small but defined quantity of lubricant and gas or air on each actuation. The actuation of the valve system and the starting up of the control program are effected by means of a light barrier mounted up on the tablet-making press, by means of a bit transmitter, or by means of a capacitive or inductive proximity switch using electrical, magnetic, or mechanical (e.g. pneumatic) pulses which act upon the valves.

Thus, the principle according to the present invention consists of the metering of a small but defined quantity of liquid lubricant into the capillary system of the dotting shoe, the subsequent release of droplets of lubricant from the nozzle opening, and application of the released lubricant droplets onto the intended zones of the pressing tools by means of a metering volume of gas (e.g., air) which flows in afterwards, this metered gas simultaneously accelerating the droplets by a predetermined amount, which can be predetermined by adjusting certain pulse magnitudes. The quantity of gas or air is made such that it does not cause uncontrolled decomposition and hence atomization of the drops.

The pulse time for metering the lubricant liquid or suspension is preferably kept greater than the pulse time for metering the air. However, it is advisable to keep the pressure of the lubricant liquid or suspension lower than the pressure of the air which follows. It has proven advantageous to have the pulse for the metering of the air occur at the moment that the metering of lubricant ends.

Generally, nozzle outlet openings of from about 0.05 to 0.3 mm are used, with a liquid pressure of from about 0.1 to 2 bar and a gas pressure of from about 0.5 to 8 bar. The pulse times for metering the liquid are then preferably from about 1.0 to 2.5 msec, and the pulse times for metering the gas are from about 1.0 to 2.0 msec. If the above criteria are followed, a quantity of lubricant of about 10 to 500 gm/hour can then be delivered through an alternating single-substance nozzle. With a tablet-making speed of 200,000 pressed articles per hour, the diameter of the pressed articles being 19 mm and their weight being 2.0 gm, the lubricant would be applied to the upper and lower dies by means of, for example, ten alternating single-substance nozzles each of which releases from about 0.5 to 25 mg of lubricant liquid onto the upper and lower dies.

In the case of capillaries with several nozzle outlet openings along the path of the capillary, there may be a drop in pressure in the region of the nozzle outlet openings at the ends, and this will result in impaired detachment of the droplets from these nozzle openings. To avoid such disruption of the release of droplets, it is advisable to taper the capillaries toward the nozzle openings at the ends. This tapering may be either stepwise or conical.

The lubricant liquid generally contains from about 5 to 50% by weight of lubricant, the remainder being a solvent or suspension agent. In the case of lubricating oils or molten fats, the concentration is 100% lubricant. Thus, for each pressed article (19 mm in diameter, 2.0 gm in weight), 0.025 to 25 mg of lubricant liquid, i.e., from about 0.001 to 1% by weight, based upon the the weight of the final tablet, are delivered, dependent upon the concentration of the lubricant liquid. The preferred range of lubricant liquid is from about 0.1 to 2 mg (from about 0.005 to 0.1% by weight). The lubricants may be stearic acid, palmitic acid, alkali metal or alkaline earth metal salts of these acids, such as magnesium stearate, potassium stearate, or aluminum stearate, and also mono-, di-, and triglycerides and mixtures thereof of medium- to long-chained fatty acids, such as glycerol monostearate or glycerol monlaurate. Particularly suitable solvents and suspension agents include water and alcohols such as ethanol, isopropanol, or mixtures thereof. The viscosity of the lubricant solutions is preferably from about 2 to 100 mPa·s (millipascal seconds), while the surface tension is from about 20×40 nM/m (millinewtons per meter). In the case of more viscous lubricants the viscosity can be reduced significantly by heating to 100° C. Naturally, it is possible to go significantly below or above the values given hereinbefore, dependent upon the properties of the lubricants to be used.

While the active surfaces of the pressing tools are guided past above and below the dotting shoe, the lubricating process, consisting of the metering of lubricant and air, is initiated once or several times, so that the pressing tools are dotted with the lubricant over their surface. Dependent upon the shape of the pressed article, all the nozzles or only some of the nozzles may be activated to release drops. In principle, each nozzle may also, if desired, be actuated separately. Zones in the pressing tools which are subject to particle stress, e.g., zones for forming engraved designs in the pressed article, may be preferentially dotted with drops of lubricant. This is achieved by a higher alternating pulse sequence in the capillaries provided for this purpose. The dotting shoe may also be divided into two separate units which are mounted offset from one another in the press and dot the upper die and pressing chamber or lower die separately. The arrangement of the nozzles over the surfaces of the dotting shoe generally depends upon the geometry of the zones of the pressing tools subject to particular stress in the pressing operation, with the zones subject to great stress being dotted with more lubricant than zones subject to less stress.

To achieve clean detachment of the drops of lubricant from the opening or openings of the nozzles in the dotting shoe, both the control program, nozzles, and capillary system, and also the physical characteristics of the lubricating liquid and the air supply, must be coordinated with the speed of the tablet-making presses. The viscosity and surface tension of the lubricating liquid helps to stabilize the formation of droplets and make it easier or more difficult to release the droplets from the nozzle opening, but a particular advantage of this process according to the invention is that it is possible to adjust the viscosity and surface tension over a very wide spectrum, for example, by varying the metering and the cyclical sequences of liquid or air or by making modifications in the capillary system or in the nozzle openings. Another possibility is to introduce warm air into the dotting shoe, the temperature being as high as about 100° C. The warm air ensures that, for example, when lubricant solutions are used, the solvent in the droplets is already substantially evaporated when the droplets make contact with the tools. This prevents any solvent from penetrating into the granulate or into the tablets. Thus, the air not only has the job of aiding the metering and acceleration of the droplets but may also have a drying function.

It was not readily foreseeable that it would be possible to avoid misting by maintaining certain conditions with regard to the pressure of liquid, the quantity of liquid, the pressure and quantity of air, and the time sequence of metering these media into the capillaries of the dotting shoe, with all the droplets of lubricant being dotted only in discrete form on to the pressing tools.

It has proven advantageous for the withdrawal force of the pressed blanks, which is measured by means of strain gauges, to be used as a regulator for the number of droplets of lubricant per unit of time (e.g., per second). If the strain gauges under the pressed blanks indicate an increase in the withdrawal force, the number of droplets per unit of time is automatically increased. This is achieved by the fact that the measured values obtained, e.g., in digital form, influence the times of opening of the lubricant valves within certain limits by means of the electronic controls.

Unlike the known two-substance nozzles wherein air and liquid are discharged simultaneously and misting often occurs, it is thus possible with the process according to the invention to apply a certain number of droplets of equal diameter to a specific surface of the pressing tool even at very high speeds of the tablet press (circumferential speeds of the punch up to 10 m/sec.).

As a result of the accurate application of lubricant to the active pressing surface of the lower die and the creeping qualities of the lubricant used, obviously enough lubricant will reach the matrix wall when the lower die is removed. The lower die can thus be dotted immediately after the tablet has been ejected before the die being submerged below the filling shoe. A particular advantage of this system is that it is not generally necessary to lower the bottom die so that the dotting shoe can lubricate the free wall of the matrix. It has also been found that direct lubrication of the tablet-making tools is exceptionally effective. Thus, with the conventional two-station high power presses, i.e., wherein one punch presses two tablets per revolution, it is generally sufficient to lubricate the tool once per revolution.

As already mentioned hereinbefore, the invention also relates to an apparatus for dotting molding tools with droplets of liquid or suspended lubricant. The apparatus consists of a dotting shoe with single substance nozzles abutting on capillaries and with separating feed lines for the lubricant liquid or suspension and for the gas abutting on the other ends of the capillaries. Fast-action valves for releasing defined quantities of liquid or gas are mounted in the liquid and gas lines. The pressure in the feed line systems is regulated absolutely and relative to one another by means of pressure regulating valves. All the valves may, for example, be regulated by means of an electronic regulating system.

The invention can perhaps be better understood by making reference to the drawings, which represent preferred embodiments of the invention. FIG. Ia represents a cross-sectional view through a dotting shoe (5) consisting of capillary (1) with a fork which is formed by compressed air feed line (2) and lubricant feed line (3). The capillary (1) has a plurality of nozzles (4) in a row, and this row is also continued on the opposite side.

FIG. Ib represents a plan view of the dotting shoe with a row of nozzle openings (**4*a***).

The drawing of FIG. IIa represents a plan view of a round dotting shoe (5) with a number of nozzle openings (**4*a*) arranged in a geometric distribution and with feed lines (2) and (3) for the lubricant solution or suspension and for the air. FIG. IIb shows a cross-sectional view through the same dotting shoe, with reference numeral (4) indicating the nozzles. The supply of lubricant liquid or suspension and air through the channels (2) and (3), respectively, is continued either by means of a capillary system (not shown) to the individual nozzles or to a row of nozzles, so that it is possible to eject lubricant and air from individual nozzles or from geometrically associated nozzles independently of one another in individual sequences, or else the feed lines (2) and (3) end in the capillary-like chamber (6) from which individual nozzles (4**) lead away on one or both sides at right angles or at a specific angle to the plane of symmetry of the dotting shoe.

FIG. III represents a cross-sectional view through a dotting shoe (5) which is particularly adapted to the matrix and upper die. In this figure, reference numeral (1) indicates the capillaries; the feed lines for air and lubricant which converge in a fork are not shown. Reference numeral (4) indicates the nozzles, (7) is the upper die, (8) is the lower die, and (9) is the matrix. The nozzles are arranged at various angles relative to each other and to the axis of the dotting shoe and thus make it possible to provide particularly intensive lubrication of the active pressing surfaces of the upper die and matrix wall.

FIG. 4 represents a cross-sectional view through a lubricant dotting apparatus according to the invention in a tablet-making machine. In this figure, reference numeral (1) is a capillary in the dotting shoe (5) with the fork of the compressed air feed line (2) and lubricant feed line (3) and a row of nozzles (4). The dotting shoe (5) is mounted excentrically relative to the axis of the lower die (8) and upper die (7). Reference numeral (9) designates the matrix, and valves (**10*a*) and (10*b*) are for releasing compressed air from the compressed air tank (11) and for guiding the lubricant out of the lubricant tank (12**).

Reference numeral (13) indicates pressure valves for regulating the pressure of the two media, namely, air and lubricant liquid. These pressure valves permit individual adjustment of the pressure of the liquid and also of the air, and also make it possible to coordinate these pressures with one another. The apparatus also has proximity switch (14) and an electronic control apparatus (15) for controlling valves (**10*a*) and (10*b***).

The following examples are intended to illustrate the invention and should not be construed as limiting it thereto.

EXAMPLES

Examples of the Preparation of Pressed Articles

EXAMPLE 1

Compressed sorbitol tablets (15 mm in diameter) were produced by the method according to the invention, with direct lubrication, a coating shoe as shown in FIG. 1*a* being used and the remainder of the apparatus being as described in the invention. The operation was done at a rate of 180,000 tablets per hour, with use of 900 gm per hour of a lubricant consisting of 4% by weight of stearic acid and 20% by weight of capryl/capric acid triglyceride in ethanol.

The liquid was metered into the dotting shoe under a pressure of 1.5 bar for 1.5 msec., and then air was metered at a pressure of 3.5 bar at a pulse width of 2.5 msec. This process, which was initiated by an induction switch, was repeated twice for each pressing tool and pressing operation.

The tablets thus obtained showed no negative changes in their surface quality compared with compressed tablets produced in the traditional way. On the other hand, the flavor was much better than that of the sorbitol tablets produced by the conventional method with the addition of magnesium stearate. By contrast, an electron scan microscope picture of a plane of fracture of a tablet showed that due to the absence of lubricant, the sorbitol crystals were totally sintered together. On the tongue, the tablets did not feel rough at all. Moreover, the desired hardness was achieved with a compressing force reduced by at least 30%.

EXAMPLE 2

Compressed tablets (12 mm in diameter) of acetylsalicylic acid lactose/starch were produced by the process according to the invention, with direct lubrication, with use of a dotting shoe as shown in FIG. 1*a* and the remainder of the apparatus being according to the invention. The operation was carried out at a rate of 180,000 tablets per hour, with use of about 100 gm of a lubricant consisting of 4% by weight of stearic acid and 6% by weight of polyoxyethylene sorbitan monooleate in ethanol. The liquid was metered into the dotting shoe under a pressure of 0.8 bar for 1.0 msec., and then air was metered out at 1.5 bar and at a pulse width of 2 msec. This process, which was initiated by an induction switch, was repeated three times for each pressing tool and pressing operation.

The tablet had a 35% high breaking strength for the same pressing force. Since the granulate was not mixed with a hydrophobic lubricant, the disintegrant can become fully active. The decomposition of the tablet was reduced from 65 to 10 seconds.

EXAMPLE 3

Compressed sorbitol tablets (15 mm in diameter) were produced by the process according to the invention, with direct lubrication, a dotting shoe as shown in FIG. IIa being used and the remainder of the apparatus being according to the invention. The operation was carried out at a rate of 180,000 tablets per hour, with use of about 700 ml of a lubricant consisting of 4% by weight of stearic acid and 20% by weight of capryl/capric acid triglyceride in ethanol. The liquid was metered into the dotting shoe at a pressure of 1.0 bar for 2.0 msec., and then air was metered out at a pressure of 5 bar and a pulse width of 1.0 msec. This process, which was initiated by an induction switch, was repeated twice for each pressing tool and pressing operation.

The resulting tablets had the same properties as the tablets prepared according to Example 1. Similar results were also obtained when a lubricant consisting of 5% by weight of glycerol monostearate, in a extremely fine suspension in water, was used.

Effervescent Tablets of Ascorbic Acid

EXAMPLE 4

Ascorbic acid, sodium bicarbonate, citric acid, dry flavoring, and sugar were individually screened and then mixed together. Tablets weighing 3.5 gm each were prepared from the mixture in a tablet press fitted with a dotting shoe, by use of the process according to the invention, with direct lubrication of the pressing tools. The lubricant fluid contained, in ethanol, 2% by weight of polyethyleneglycol 6000 and 3% by weight of a glycerol/polyethyleneglycol oxystearic (CREMOPHOR RH40 ®, available from BASF, Ludwigshafen), the liquid pressure was 1.5 bar, and the pulse width was 2.5 ms. Air was metered out at 3.5 bar at a pulse width of 3 msec. The quantity of lubricant used per tablet was 0.4 mg.

In comparison to a conventional process, there are a number of advantages in the production of effervescent tablets. For example, there are the following:

1. Any conventional tablet press can be used.
2. There is no need for a lower die with a felt packing, specially drilled matrices, and specially lined upper and lower dies.
3. The service life is considerably longer, and the cleaning maintenance required for the machine is greatly reduced.
4. The tablet-making rate can be increased substantially.
5. There is no danger of the effervescent tablets adhering to the dies.

Catalyst Tablet

EXAMPLE 5

A mixture of silicon dioxide, aluminum oxide hydrate, and chromium oxide ($Cr_2O_3$) with a particle size of between 0.1 and 1 mm was combined and compressed in a tablet press to form cylinders measuring 8 mm in diameter and 5 mm high. The machine was fitted with a dotting shoe. The lubricant liquid consisted of thin paraffin oil. The pulse width of the metering valve was coupled with the measured values for the ejection force. For this purpose, the ejecting bar was fitted with strain gauges so that the force for ejecting each tablet from the matrix could be measured (for an increase in the ejection force, the quantity of lubricant liquid released is also increased). Normally, 0.5 mg of paraffin oil would be required for each tablet.

This catalyst tablet has a number of advantages over catalyst tablets produced by the conventional method. Since there is no hydrophobic lubricant inside, the tablets are about 50% harder. This is of great importance since the charging of tube-shaped reactors with a length of several meters and the temperature conditions during the process require maximum compressive strength, wear strength, and inner cohesion of the tablets. The hardness of the new tablets is so good that there is no need to add a binder such as calcium aluminate cement in the usual way. This in turn increases the purity of the catalyst, thereby benefiting the degree of use and the service life of the catalyst.

While the present invention has been illustrated with the aid of certain specific embodiments thereof, it will readily be apparent to others skilled in the art that the invention is not limited to these particular embodiments, and that various changes and modifications may be made without departing from the spirit of the invention or the scope of the appended claims.

We claim:

1. In a method of preparing shaped articles from granulate material comprising introducing granulate material into a mold die cavity, compressing the granulate material in the mold die with a cooperating punch to form shaped articles, and ejecting the shaped articles from the mold die cavity, the improvement wherein a lubricant film is formed on mating surfaces of the mold die cavity and cooperating punch by alternately releasing through each of a multitude of single-substance nozzles a defined quantity of lubricant liquid or suspension under pressure and then a defined quantity of gas under pressure, the quantity of gas causing (1) the lubricant liquid or suspension to form droplets of uniform shaped and size, (2) said droplets to detach from the nozzles, and (3) said droplets to accelerate in a directed manner toward specific zones of the mating surfaces to provide lubrication of the mating surfaces.

2. The method of claim 1, wherein air is used as the gas, the volume of gas used in the same unit of time being from about 10 to 50 times as great as the corresponding volume of liquid or suspension and the temperature of the gas being up to about 100° C.

3. The method of claim 1, wherein a liquid pressure of from about 0.1 to 6 bar and a gas pressure of from about 0.5 to 8 bar are used.

4. The method of claim 1, wherein each release of lubricant liquid or suspension is longer in duration than each release of gas.

5. The method of claim 1, wherein the pressure on the lubricant liquid or suspension is less than the pressure on the gas, strain gauges measure forces to eject the shaped articles, and timing of release of lubricant liquid or suspension is co-determined by values measured by said strain gauges.

* * * * *